March 2, 1954  H. M. DODGE  2,671,041
METHOD OF FORMING PLASTIC WEATHER
STRIPPING AND WINDLACES
Filed Jan. 11, 1952  2 Sheets-Sheet 1
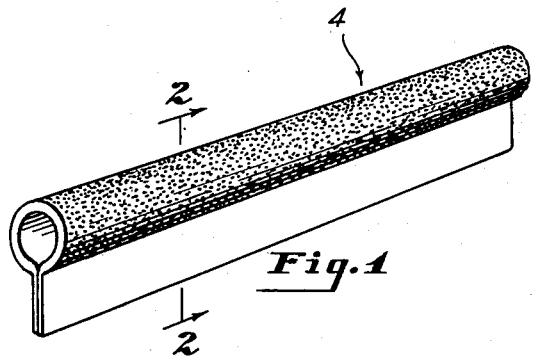
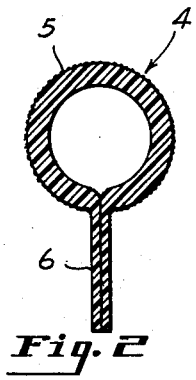
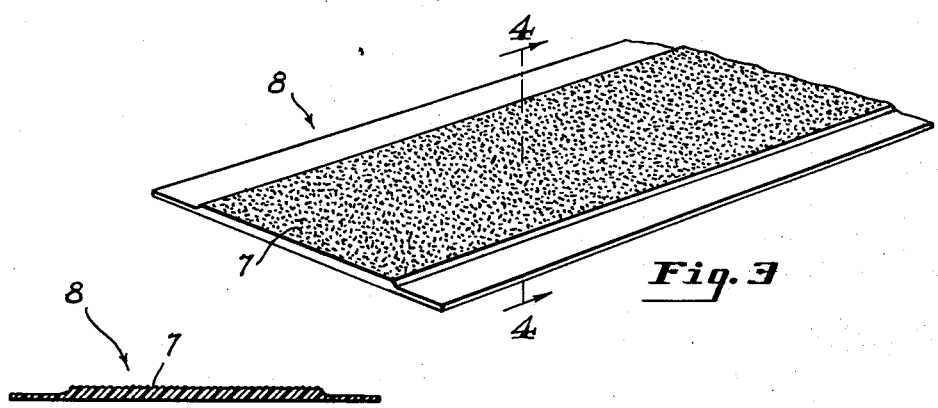
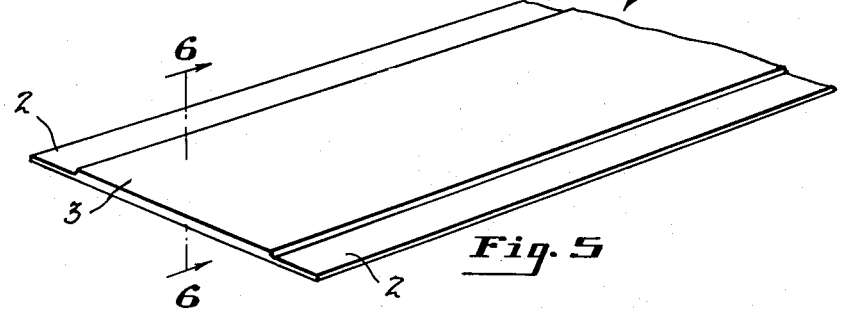
INVENTOR
*Howard M. Dodge*
BY *Evans + McCoy*
ATTORNEYS March 2, 1954
H. M. DODGE
2,671,041
METHOD OF FORMING PLASTIC WEATHER
STRIPPING AND WINDLACES
Filed Jan. 11, 1952
2 Sheets-Sheet 2
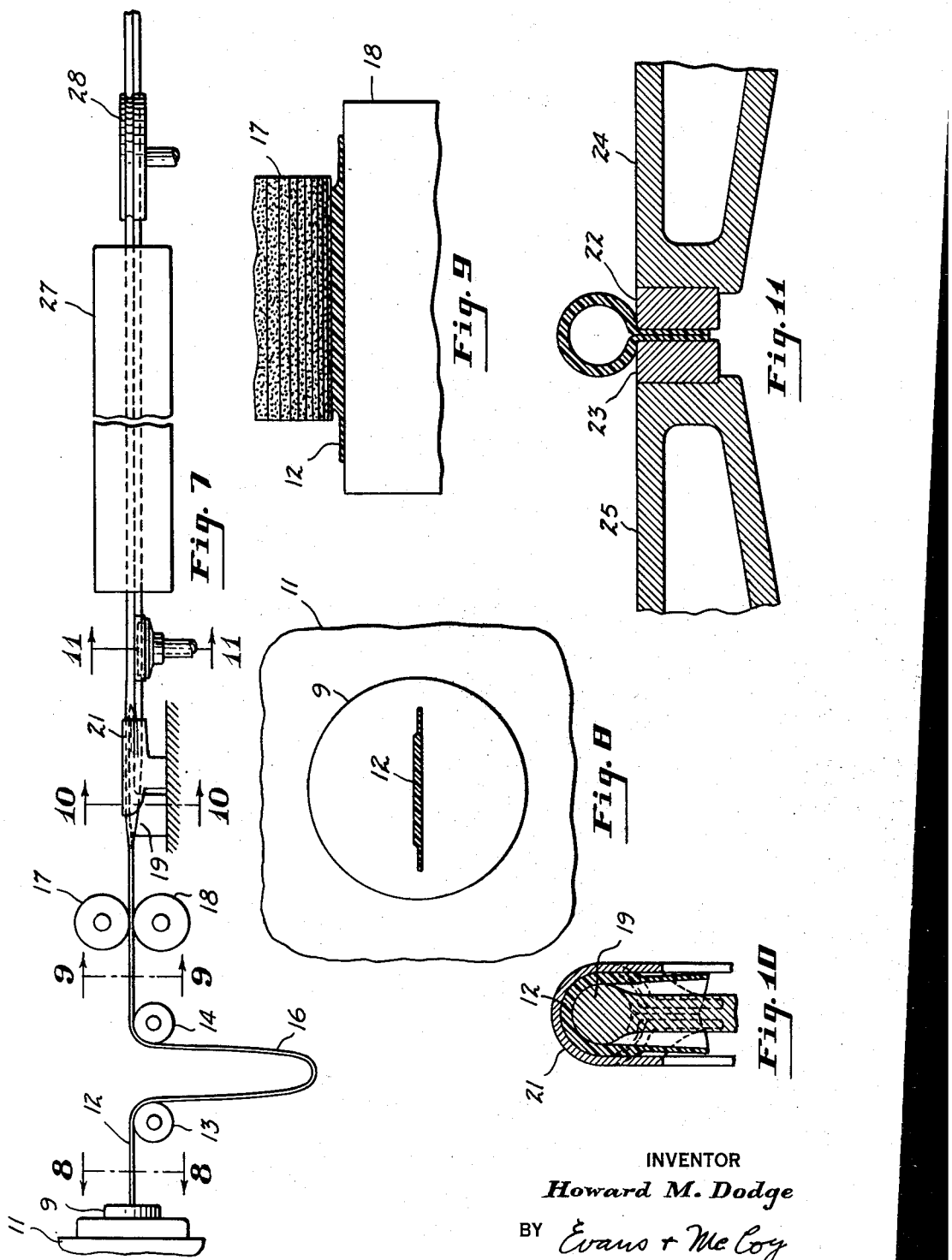
INVENTOR
*Howard M. Dodge*
BY *Evans + McCoy*
ATTORNEYS Patented Mar. 2, 1954

2,671,041

UNITED STATES PATENT OFFICE 2,671,041

METHOD OF FORMING PLASTIC WEATHER STRIPPING AND WINDLACES

Howard M. Dodge, Akron, Ohio, assignor to The General Tire and Rubber Company, Akron, Ohio, a corporation of Ohio Application January 11, 1952, Serial No. 265,994

3 Claims. (Cl. 154—84)

This invention relates to a method of manufacturing plastic weather stripping, windlaces, and the like and particularly to a method of forming weather stripping with engraved surface characteristics.

It has been found generally desirable that weather stripping and windlaces have an uneven surface such as a stippled surface. This is decorative and provides superior sliding action against glass and other smooth surfaces.

The common method of manufacturing plastic windlaces is to extrude them to the shape desired. This provides an inexpensive and economical form of windlace, but it has a smooth even surface.

The principle object of this invention to to provide a simple and inexpensive method of making plastic weather stripping and the like with engraved, decorative surface characteristics and in which the engraving may provide some of the important characteristics of surfaces comprising fibers to enhance wiping and frictional properties.

Other objects and advantages will be apparent from the following description of the invention and the accompanying drawings in which like numerals relate to like parts. In the drawings:

Figure 1 is a perspective view of a length of windlace manufactured in accordance with the subject invention.

Fig. 2 is a cross-sectional view of the windlace of Fig. 1 taken along line 2—2 of Fig. 1.

Fig. 3 is a perspective view of a length of material prior to shaping but subsequent to surface alteration.

Fig. 4 is a cross-sectional view of the material of Fig. 3 taken along line 3—3 of Fig. 3.

Fig. 5 is a perspective view of a length of material as extruded.

Fig. 6 is a cross-sectional view of the material of Fig. 5 taken along line 6—6 of Fig. 5.

Fig. 7 is a front elevation of apparatus for the subject invention.

Fig. 8 is a view of the extruding die taken along line 8—8 of Fig. 7.

Fig. 9 is a view of the engraving role taken along line 9—9 of Fig. 7.

Fig. 10 is a view of the bending mandrel taken along line 10—10 of Fig. 7.

Fig. 11 is a view of the heat sealing platens taken along line 11—11 of Fig. 7.

In accordance with the subject invention, plastic material is extruded or formed in a substantially flat band or ribbon, the surface is suitably engraved, the band is bent or guided to the desired shape and then the edges are sealed together.

The band or ribbon 1 as extruded is preferably provided with recessed edge portions 2 and a raised center portion 3. The edge portions of the band are relatively thin so that when they are joined together as in Fig. 2 the resulting ridge 6 is not too stiff and thick. The band as extruded can be flat or slightly convex as desired. A convex band is arcuate in cross-section with the raised center portion outward. In any case, it must lend itself to the subsequent engraving operation.

The surface of the band is engraved or otherwise molded to provide uneven surface characteristics subsequent to extrusion and prior to final shaping. The surface can be provided with various designs such as a criss-cross design, a stippled design, or other designs which can be engraved into it to provide hills and valleys to enhance wiping and sliding action. All or only longitudinal strip portions of the raised portion of the band can be engraved as desired. The surface 7 of the band 8 in Figs. 3 and 5 is stippled.

After the band of extruded plastic has been suitably engraved, it is bent or shaped to the final form. This operation is preferably performed by drawing the band through a series of dies or a single die with a longitudinally changing relationship as in the conventional strip fabric folders so that the band is successively brought to the final rounded shape with the edge portions abutting one another.

The final shape of the weatherstripping is preferably round or circular as shown by bead portion 5 of windlace 4 in Fig. 2, but it can be elliptical or irregularly curved. The shape shown has been found suitable for windlaces for automobile bodies.

After the band has been shaped, the abutting edge portions 2 are heat sealed or cemented or otherwise joined together. This provides flap or ridge 6 of the windlace as shown in Fig. 2. The edges are preferably heat sealed together because this is a relatively inexpensive and rapid method of joining them together.

Figs. 7 to 11 illustrate one form of apparatus suitable for performing the process of this invention. In this apparatus, the plastic is extruded through die 9 of extruding apparatus 11 to come out in ribbon form 12 (Fig. 8). The ribbon hangs down between spaced rolls 13 and 14 to provide an intermediate loop 16 to accommodate and adjust for ribbon tension. The ribbon next passes between engraving roll 17 and supporting roll 18 to have the top surface engraved (Fig. 9).

At mandrel 19 and die or shaping channel 21, the ribbon is bent and formed so that the ribbon edges abut and the windlace bead portion is formed (Fig. 10). The edges are then heat sealed together between rims 22 and 23 mounted on steam heated horizontal rolls 24 and 25 respectively. Rolls 24 and 25 are gear driven to provide even sealing pressure. Finally, the ribbon is air cooled in cooling chamber 27 and passes through pulling rolls 28 to be wound on a spool or cut to length as desired.

Pulling rolls 28 pull the windlace through the mandrel and die and so forth. They comprise a pair of power driven, substantially horizontal rolls, one on each side of the windlace.

The plastic employed can be any of the extrudable, thermoplastic compounds such as polyethylene, polyvinyl chloride, and the various natural and synthetic rubber compositions.

Having thus described by invention, what I claim is:

1. A method of forming plastic windlaces comprising the steps of extruding the plastic in a substantially flat band, engraving one surface of said band, bending and shaping said band to a shape with a rounded cross-section and abutting edge portions, and sealing said abutting edge portions together.

2. A method of forming plastic windlaces comprising the steps of extruding the plastic in a substantially flat band with recessed edge portions and a raised center position, stippling the surface of the center portion of said band, bending and shaping said band to a shape with a rounded cross-section and abutting edge portions and with the stippled surface outermost, and heat sealing said edge portions together.

3. A method of forming plastic windlaces comprising the steps of extruding thermoplastic material in the form of a substantially flat band, and while said material is in a thermoplastic condition successively engraving one surface of said band, bending and shaping said band to a shape with a rounded cross-section and abutting edge portions and with said engraved surface outermost and heat sealing said edge portions together, air cooling said windlace, and passing said windlace between pulling rolls to pull it through the aforesaid operations.

HOWARD M. DODGE.

References Cited in the file of this patent

UNITED STATES PATENTS

| Number | Name | Date |
|---|---|---|
| 1,952,038 | Fischer | Mar. 20, 1934 |
| 2,345,273 | Macklanburg | Mar. 28, 1944 |
| 2,419,322 | Matheny | Apr. 22, 1947 |
| 2,483,584 | Lesavoy | Oct. 4, 1949 |
| 2,519,330 | Evans et al. | Aug. 15, 1950 |

FOREIGN PATENTS

| Number | Country | Date |
|---|---|---|
| 101,283 | Australia | June 8, 1937 |
| 103,883 | Australia | May 3, 1938 |
| 631,890 | Great Britain | Nov. 11, 1949 |